US009692911B1

(12) United States Patent
Chowdhury et al.

(10) Patent No.: US 9,692,911 B1
(45) Date of Patent: Jun. 27, 2017

(54) METHODS, SYSTEMS, AND COMPUTER READABLE MEDIA FOR USING USER DEFINED SESSION DESCRIPTION PROTOCOL (SDP) RULES

(71) Applicant: Oracle International Corporation, Redwood Shores, CA (US)

(72) Inventors: Sayan Chowdhury, Waltham, MA (US); Tarek Assali, Wellesley, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/973,625

(22) Filed: Dec. 17, 2015

(51) Int. Cl.
| | |
|---|---|
| *H04M 15/00* | (2006.01) |
| *H04W 4/24* | (2009.01) |
| *H04L 12/14* | (2006.01) |
| *H04L 29/06* | (2006.01) |

(52) U.S. Cl.
CPC ............ *H04M 15/66* (2013.01); *H04L 12/14* (2013.01); *H04L 65/1006* (2013.01); *H04W 4/24* (2013.01); *H04L 65/1069* (2013.01)

(58) Field of Classification Search
CPC ......... H04M 15/66; H04W 4/24; H04L 12/14; H04L 65/1006; H04L 65/1069; H04L 65/1016; H04L 12/1403; H04L 12/1407
See application file for complete search history.

(56) References Cited

U.S. PATENT DOCUMENTS

| | | | |
|---|---|---|---|
| 6,366,577 | B1 | 4/2002 | Donovan |
| 6,714,987 | B1 | 3/2004 | Amin et al. |
| 2002/0184346 | A1 | 12/2002 | Mani |
| 2003/0088421 | A1 | 5/2003 | Maes et al. |
| 2004/0170156 | A1 | 9/2004 | O'Neill |
| 2004/0196867 | A1 | 10/2004 | Ejzak et al. |

(Continued)

FOREIGN PATENT DOCUMENTS

| | | |
|---|---|---|
| EP | 1 882 250 B1 | 3/2016 |
| WO | WO 2004/112335 A1 | 12/2004 |
| WO | WO 2006/124790 A2 | 11/2006 |

OTHER PUBLICATIONS

"Universal Mobile Telecommunications System (UMTS); LTE; Policy and charging control over Rx reference point (3GPP TS 29.214 version 10.3.0 Release 10)," ETSI TS 129 214 V10.3.0, pp. 1-52 (Jun. 2011).

(Continued)

*Primary Examiner* — Nam Huynh

(74) *Attorney, Agent, or Firm* — Jenkins, Wilson, Taylor & Hunt, P.A.

(57) ABSTRACT

Methods, systems, and computer readable media for using user defined session description protocol (SDP) rules are disclosed. According to one method, the method occurs at a policy and charging rules function (PCRF). The method includes receiving at least one user defined SDP rule, wherein the user defined SDP rule includes at least one SDP parameter reference for referencing at least one SDP parameter. The method also includes receiving SDP information in an SDP related message associated with setting up a session. The method further includes determining, using the at least one user defined SDP rule and the SDP information, a policy related rule associated with the session.

18 Claims, 4 Drawing Sheets

(56) References Cited

U.S. PATENT DOCUMENTS

| | | |
|---|---|---|
| 2005/0033985 A1 | 2/2005 | Xu et al. |
| 2005/0073997 A1 | 4/2005 | Riley et al. |
| 2006/0149845 A1 | 7/2006 | Malin et al. |
| 2010/0217877 A1* | 8/2010 | Willars .................. H04W 4/24 709/228 |

OTHER PUBLICATIONS

Handley et al., "SDP: Session Description Protocol," RFC 4566, pp. 1-49 (Jul. 2006).
Final Office Action for U.S. Appl. No. 11/435,380 dated Jul. 13, 2009.
Non-Final Office Action for U.S. Appl. No. 11/435,380 dated Oct. 27, 2008.
International Search Report, corresponding to PCT Application No. US06/18758, mailed Aug. 22, 2007.
"Camiant's Policy Server," Products, Camiant: The Leader in Policy Control (Feb. 8, 2007). http://web.archive.org/web/20070208062144/http://www.camiant.com/products2.shtml.
Rosenberg et al., "Best Current Practices for Third Party Call Control (3pcc) in the Session Initiation Protocol (SIP)," Network Working Group, RFC 3725 (Apr. 2004).
"PacketCable™ Multimedia Architecture Framework," Technical Report, PKT-TR-MM-ARCH-V01-030627 (2003).
Rosenberg et al., "An Offer/Answer Model with the Session Description Protocol (SDP)," Network Working Group, RFC 3264 (Jun. 2002).
Handley et al., "SDP: Session Description Protocol," Network Working Group, RFC 2327 (Apr. 1998).
Office Action for Canadian Patent Application Serial No. 2 608 641 (Apr. 26, 2016).
Office Action for Canadian Patent Application Serial No. 2 608 641 (Jun. 4, 2015).
Intent to grant a European Patent Application No. 06 759 859.9 (Oct. 27, 2015).
Office Action for Canadian Patent Application Serial No. 2 608 641 (May 16, 2014).
Communication pursuant to Article 94(3) EPC for European Patent Application No. 06 759 859.9 (Jun. 4, 2013).
Office Action for Canadian Patent Application Serial No. 2 608 641 (May 31, 2013).
Communication pursuant to Article 94(3) EPC for European Patent Application No. 06 759 859.9 (Feb. 14, 2012).
Communication pursuant to Article 94(3) EPC for European Patent Application No. 06 759 859.9 (Apr. 20, 2011).
Communication of the extended European search report for European Patent Application No. 06759859.9 (Aug. 24, 2010).
Letter regarding Examiner's first report for Australian Patent Application No. 2006247431 (Nov. 19, 2009).
Goulart et al., "On overlapping resource management and call setup signaling:a new signaling approach for internet multimedia applications," Computer Communications 25, pp. 851-863 (2005).
Marshall et al., "Architectural Considerations for Providing Carrier Class Telephony Services Utilizing Session Initiation Protocol (SIP)-based Distributed Call Control Mechanisms," Sipping Working Group, Internet Draft, Category: Informational, pp. 1-22 (Jan. 15, 2003).

* cited by examiner

200

Codec-Data (524,VM,v=10415,l=216) =
1  uplink
2  offer
3  s=SDP Example
4  i=Information on SDP
5  u=http://www.example.com/sdprequest.pdf
6  m=audio 41000 RTP/AVP 104 102 0 100
7  a=rtpmap:104 AMR-WB/16000
8  a=fmtp:104 mode-set=2,6
9  a=rtpmap: 102 AMR/8000
10 a=fmtp:102 mode-set=7
11 a=rtpmap: 100 telephone-event/8000
12 a=fmpt: 100 0-15
13 a=ptime:20
14
15

202

Codec-Data (524,VM,v=10415,l=182) =
1  downlink
2  answer
3  s=SDP Example Response
4  i=Information on SDP in Response
5  u=http://www.example.com/sdpresponse.pdf
6  m=audio 41000 RTP/AVP 104 100
7  a=rtpmap:104 AMR-WB/16000
8  a=fmtp:104 mode-set=2,6
9  a=rtpmap: 100 telephone-event/8000
10 a=fmtp: 100 0-15
11 a=ptime:20
12 a=maxptime:20
13
14
15

FIG. 2

| SDP RULE ID | SDP RULE |
| --- | --- |
| 1 | IF LOCAL.SDP.[I] = 'REQUEST X' AND REMOTE.SDP.[I] = 'RESPONSE X' THEN IMPLEMENT 'POLICY PROFILE 1' |
| 2 | IF (COMMON.SDP.[M].FMT INCLUDES '100' OR COMMON.SDP.[M].FMT INCLUDES '104') AND COMMON.SDP.[M].MEDIA = 'AUDIO' AND COMMON.SDP.[M].PROTO = 'RTP/AVP' THEN IMPLEMENT 'POLICY PROFILE 2' |
| 3 | IF LOCAL.SDP.[A=MAXPTIME] > '60' THEN IMPLEMENT 'PCC RULE 1' |

METHODS, SYSTEMS, AND COMPUTER READABLE MEDIA FOR USING USER DEFINED SESSION DESCRIPTION PROTOCOL (SDP) RULES

TECHNICAL FIELD

The subject matter described herein relates to network communications. More specifically, the subject matter relates to methods, systems, and computer readable media for using user defined session description protocol (SDP) rules.

BACKGROUND

Session description protocol (SDP) is defined in Internet Engineering Task Force (IETF) request for comments (RFC) 4566; the disclosure of which is incorporated by reference herein in its entirety. SDP is usable for describing multimedia sessions for the purposes of session announcement, session invitation, and other forms of multimedia session initiation. SDP also provides a framework by which it can be extended easily as new multimedia services and capabilities are introduced. For example, for an audio service, if a new audio codec is defined, SDP can be extended to advertise the new codec parameters to the participants in the audio service.

A policy and charging rules function (PCRF) may use SDP information to derive policy and charging control (PCC) rules, such as quality of service (QOS) and charging characteristics, for different multimedia sessions. For example, a PCRF may take different actions based on different SDP parameters. In this example, if a media type advertised in an SDP message is audio as opposed to video, different amount of bandwidth may need to be reserved in the network. Even if the codec and the media type remain the same, but attributes of the codec changes (e.g., the octet-aligned parameter for the AMR-WB codec), the amount of bandwidth reserved in the network may also need to change.

As new multimedia services are introduced, new SDP parameters (e.g., as codecs, clock rates, attribute lines, packetization times, etc.) and/or SDP extensions may also be introduced. In order to support new SDP parameters and/or SDP extensions, a conventional PCRF needs software modifications to incorporate the new SDP parameters and/or SDP extensions. However, such modifications can be time consuming and error-prone which may be undesired to network operators or other users.

Accordingly, there exists a need for methods, systems, and computer readable media for using user defined SDP rules.

SUMMARY

Methods, systems, and computer readable media for using user defined session description protocol (SDP) rules are disclosed. According to one method, the method occurs at a policy and charging rules function (PCRF). The method includes receiving at least one user defined SDP rule, wherein the user defined SDP rule includes at least one SDP parameter reference for referencing at least one SDP parameter. The method also includes receiving SDP information associated with setting up a session. The method further includes determining, using the at least one user defined SDP rule and the SDP information, a policy related rule associated with the session.

According to one system, the system includes a PCRF. The PCRF includes a processor and a memory. The PCRF is configured to receive at least one user defined SDP rule, wherein the user defined SDP rule includes at least one SDP parameter reference for referencing at least one SDP parameter, to receive SDP information associated with setting up a session, and to determine, using the at least one user defined SDP rule and the SDP information, a policy related rule associated with the session.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory. For example, a node may include a virtual machine and/or other software executing on a physical computing platform.

As used herein, the terms 'function' or 'module' refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating session description protocol (SDP) information;

FIG. 3 is a diagram illustrating SDP rule information according to an embodiment of the subject matter described herein.

DETAILED DESCRIPTION

The subject matter described herein relates to methods, systems, and computer readable media for using user defined session description protocol (SDP) rules. Generally, a PCRF cannot be programmed easily or dynamically for deployment changes, such as adding new multimedia services that utilize new SDP parameters. For example, as new phones are deployed and new multimedia services are rolled out, it is highly desirable for a PCRF to be able to make policy decisions using SDP information, even when the SDP information is related to new media services or new SDP parameters. However, since PCRFs typically lack this flexibility and require PCRF software updates prior to rollouts of new services, such rollouts are generally slow and expensive.

In accordance with some aspects of the subject matter described herein, techniques, methods, or mechanisms are disclosed for using an SDP query language for generically referencing SDP information. For example, an SDP rule may indicate that a PCRF should implement a policy related rule if a certain SDP parameter for a session equals a certain value. In this example, the SDP rule may use an SDP query language (e.g., a token based language) to refer to the SDP parameter. Continuing with this example, the SDP parameter reference may include multiple tokens that together refer to an 'i=' line in some uplink SDP information for a session, e.g., 'local.sdp.i'.

In accordance with some aspects of the subject matter described herein, techniques, methods, or mechanisms are disclosed for using SDP rules at a policy and charging rules function (PCRF). For example, a PCRF may be configured to receive SDP rules from a user or network operator, where the SDP rules include references based on an SDP query language. In this example, the PCRF may be configured to resolve the references into discrete or discernible values and, if rule criteria are met, implement or execute a policy related decision indicated by the SDP rules.

Advantageously, in accordance with some aspects of the subject matter described herein, by using an SDP query language to reference SDP information in user defined SDP rules, a PCRF may be configured for receiving, resolving, and/or processing the SDP rules, thereby allowing the PCRF to be quickly updated when new multimedia services and new SDP information are deployed in a network. In contrast, PCRFs that cannot process user defined SDP rules or resolve a token based SDP query language must receive software modifications, e.g., via source code patches from a manufacturer, before utilizing new multimedia services and new SDP information.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
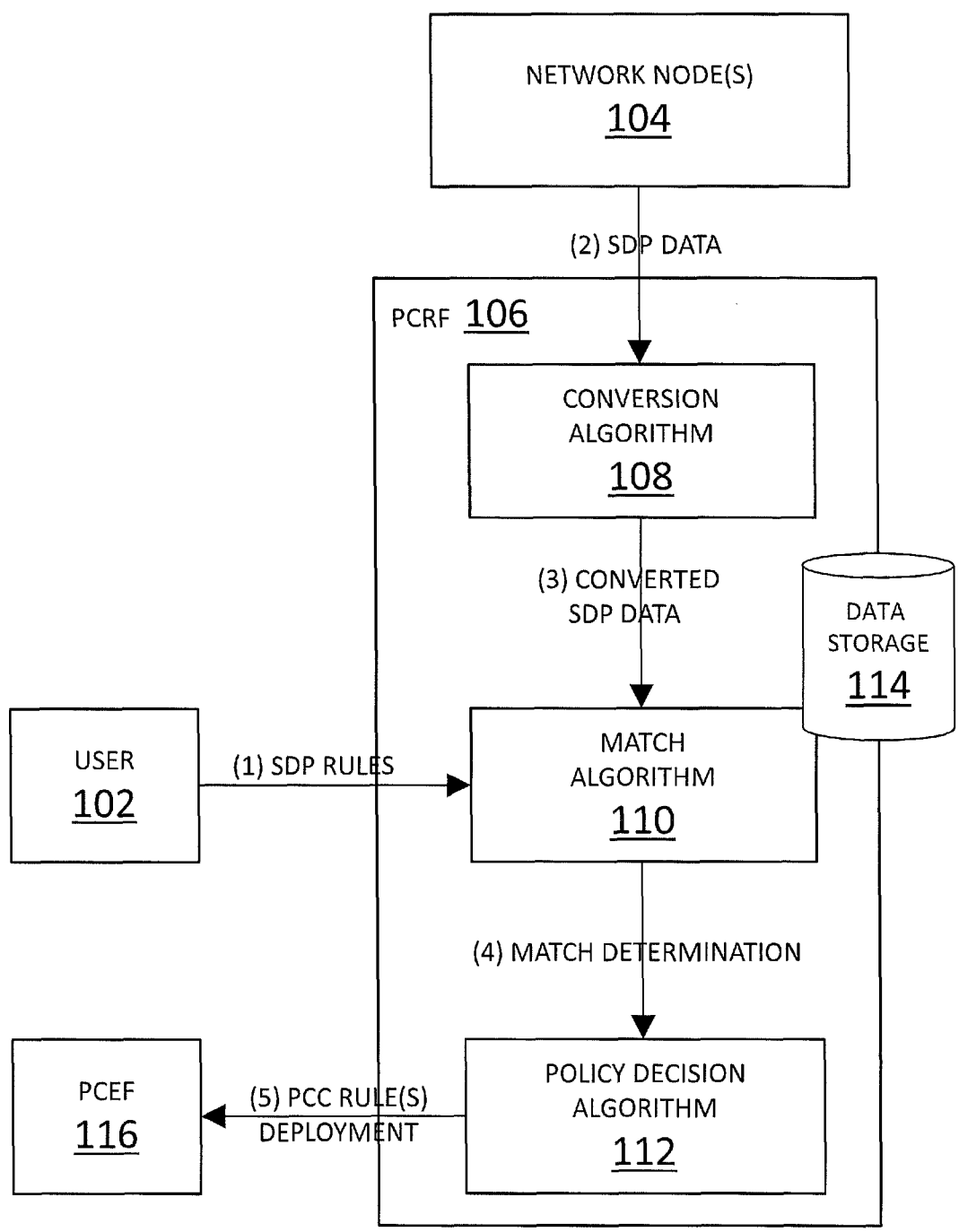
FIG. 1 is a diagram illustrating a network according to an embodiment of the subject matter described herein.

FIG. 1 is a diagram illustrating a network 100 according to an embodiment of the subject matter described herein. Network 100 may represent any network (e.g., an evolved packet core (EPC) network, an Internet protocol (IP) multimedia subsystem (IMS) network, a Third Generation Partnership Project (3GPP) network, a policy and charging control (PCC) network, and/or other networks) that may use SDP information for making policy control and charging decisions. Network 100 may include a user 102, one or more network nodes 104, a PCRF 106, and a PCEF 116.

User 102 may be any suitable entity (e.g., an automated system or a device or system controlled or controllable by a human user) for configuring various aspects associated with PCRF 106. For example, various user interfaces (e.g., an application user interface (API) and a graphical user interface (GUI)) may be provided for specifying, defining, or implementing SDP related rules for affecting policy related decisions. Exemplary user interfaces for configuring PCRF 106 may support automation (e.g., via one or more scripting languages), a representation state transfer (REST) API, a command line, and/or a web based GUI.

In some embodiments, user 102 may utilize an SDP query language for referencing SDP parameters or related information when defining an SDP rule or a related expression. An example SDP query language may involve a token based language, where some tokens represents various parts or portion of SDP information. For example, tokens or syntax elements may be hierarchical and may represent single data elements, e.g., an SDP parameter, a codec specific attribute, or may represent multiple data elements, e.g., all SDP information from a source, a line of SDP information, etc. An SDP query language may be generic in that various types of SDP parameters and related information may be referenced, including proprietary SDP parameters, non-proprietary SDP parameters, custom SDP parameters, and/or new SDP parameters. For example, using an SDP query language, an SDP rule may reference a media format SDP parameter that is common to both an uplink party and a downlink party in a session using the SDP parameter reference or variable, 'common.sdp.[m].fmt'. In this example, the 'common' token represents session attributes that are common to both parties, the 'sdp' token represents SDP parameters of the common session attributes, the '[m]' token represents media related SDP parameters (e.g., attributes associated with an 'm' line of SDP information), and the '[fmt]' token represents a media format SDP parameters (e.g., a portion of the 'm' line that indicates a media format). Additional details regarding examples of an SDP query language are further discussed with reference to FIGS. 2 and 3.

Network node(s) 104 may represent any suitable entities for sending or providing SDP information to PCRF 106. For example, network node(s) 104 may include an IMS network node, such as a proxy call signaling control function (P-CSCF). In another example, network node(s) 104 may include an EPC network node, such as an application function (AF) or a related node, capable of sending SDP information via Diameter signaling messages using with one or more Diameter related signaling interfaces, e.g., Rx and/or S9. In another example, network node(s) 104 may include a node (e.g., a session initiation protocol (SIP) server or over-the-top (OTT) server) capable of sending SDP information via a simple object access protocol (SOAP) message or an extensible markup language (XML) message.

PCRF 106 may be any suitable entity for creating, selecting, or determining PCC rules and/or policy profiles (e.g., a quality of service (QOS) and/or charging profile). For example, PCRF 106 may be a stand-alone node, e.g., a policy server or a multimedia policy engine (MPE), or may be co-located or integrated with one or more nodes in network 100. PCRF 106 may inform PCEF 116, through the use of PCC rules, on the treatment of each session data flow (SDF) that is under PCC control, in accordance with policy decisions. In performing policy decisions, PCRF 106 may communicate with network node(s) 104 for gathering session related information, such as SDP information from one or more SDP related messages sent from an AF.

Session related information may be used (e.g., by PCRF 106) to generate PCC rules and/or policy profiles. PCC rules typically include information for managing user plane traffic (e.g., data packets). For example, a PCC rule may include a rule name, service identifier, SDF filter(s), precedence information, gate status, QOS parameters, charging key (i.e., rating group), other charging parameters, and/or monitoring key. The rule name or PCC rule identifier may be used to reference a PCC rule in the communication between the PCEF and the PCRF and may be unique for each PCC rule used during an IP-CAN session. The service identifier may be used to identify the service or the service component to which the SDF relates. The SDF filter(s) may be used to select the traffic for which the rule applies. For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For instance, network node(s) 104 or another node in network 100 may assign an SDF identifier (e.g., a value) to packets in a custom parameter field. In this instance, an SDF filter in a PCC rule may use this parameter for determining traffic for which the rule applies.

PCC policy decisions may be based on one or more of the following: session related information (e.g., SDP parameters, such as codec values and/or media attributes) obtained from network node(s) 104 (e.g., an AF via the Rx interface), information obtained from PCEF 116 (e.g., Internet protocol connectivity access network (IP-CAN) bearer attributes, request type, device information, and subscriber related information), subscriber related data and service related data obtained from a subscriber profile repository (SPR), and pre-configured information.

In some embodiments, PCRF 106 may include functionality for receiving, parsing, and/or processing an SDP rule and/or syntax associated with an SDP query language. For example, a user defined SDP rule may reference SDP parameters or related information that is to be evaluated for incoming SDP information from network node(s) 104. In this example, PCRF 106 may resolve the references to discernible values using the incoming SDP information and may determine whether an SDP rule is invoked for a given session (e.g., whether criteria associated with an SDP rule is met). If so, PCRF 106 may send one or more policy related rules (e.g., a certain QOS and/or charging profile) to PCEF 116 as indicated by the related SDP rule.

In some embodiments, PCRF 106 may include functionality for using the SDP rules when making policy related decisions. For example, PCRF 106 may include a conversion algorithm 108, a match algorithm 110, and/or a policy decision algorithm 112. In this example, each algorithm may represent logic and/or software that may be stored in data storage 114 and/or may be executed by one or more processors in PCRF 106.

In some embodiments, PCRF 106 may be configured to dynamically receive, process, and utilize SDP rules from user 102. For example, PCRF 106 may receive SDP rules from user 102 via a REST API, a command line interface (CLI), or other communications interface during an initialization or start-up phase of PCRF 106. In this example, PCRF 106 may receive the SDP rules and convert or otherwise utilize the SDP rules when performing policy related decisions. In another example, after an initialization phase, PCRF 106 may continue to receive additional SDP rules from user 102 and may utilize the additional SDP rules. In this example, during normal operation and/or without powering down or restarting, PCRF 106 may modify, replace, or override some SDP rules with the additional SDP rules.

PCRF 106 may include and/or access data storage 114. Data storage 114 may represent any suitable entity (e.g., a non-transitory computer readable medium, embedded memory, or a memory device) for storing data associated with SDP related policy rules and other information. Data storage 114 may store software and/or logic associated with one or more algorithms associated with PCRF functionality. Data storage 114 may also store associations between SDP rule identifiers and SDP rules. Data storage 114 may also store various PCC rules and/or related policy profiles (e.g., groups of PCC rules).

In some embodiments, data storage 114 may be accessible by PCRF 106, conversion algorithm 108, match algorithm 110, policy decision algorithm 112, and/or other entities. In some embodiments, data storage 114 may be located on a single device or computing platform or may be distributed across multiple devices or computing platforms.

Conversion algorithm 108 may represent software and/or logic for converting, processing, and/or storing SDP information received by PCRF 106. For example, PCRF 106 and/or conversion algorithm 108 may receive SDP information via an SDP related message, such as a call setup message, a Diameter message, a Diameter AA-request (AAR) message, a SOAP message, an XML message, a SIP message, or a SIP INVITE message. In this example, the SDP information may be stored in the SDP related message using one or more attribute value pairs (AVPs), e.g., a Codec-Data AVP in an Rx AAR message. Conversion algorithm 108 may convert SDP information, such as SDP parameters, attributes, and/or related information, for storing in one or more data structures. For example, conversion algorithm 108 may parse SDP information into various groups of related data and store the various groups using associative arrays, linked lists, hash maps, or other searchable or indexable data structures.

In some embodiments, conversion algorithm 108 may generate or populate data structures that are usable with SDP rule and/or an SDP query language. For example, conversion algorithm 108 may store relevant SDP information into multiple hash maps or associative arrays. In this example, when PCRF 106 or another entity (e.g., match algorithm 110) attempts to evaluate the SDP information using user defined rules containing SDP parameter references based on an SDP query language, PCRF 106 or another entity (e.g., match algorithm 110) may use the SDP parameter references as keys or input into the hash maps or associative arrays for resolving the SDP parameter references and obtaining actual values from the hash maps or associative arrays.

In some embodiments, conversion algorithm 108 may analyze, parse, and/or store SDP information based on a related entity (e.g., remote entity or local entity) and/or link direction (e.g., uplink or downlink). For example, when conversion algorithm 108 receives SDP information in a Codec-Data AVP, conversion algorithm 108 may parse the SDP information into separate data structures, where one data structure stores local (e.g., uplink) SDP parameters, one data structure stores remote (e.g., downlink) SDP parameters, and one data structure stores common (e.g., to both local and remote entities) SDP parameters. In this example, conversion algorithm 108 may determine or derive common parameters by identifying common or shared values from local SDP parameters and remote SDP parameters. Continuing with this example, the data structures may involve multi leveled hash maps in order to provide efficient retrieval of SDP parameters when evaluating SDP rule that use a generic SDP query language for referencing SDP parameters.

Match algorithm 110 may represent software and/or logic for analyzing, matching, and/or evaluating SDP information received by PCRF 106 using one or more SDP rules. For example, match algorithm 110 may match and/or compare SDP rules (e.g., expressions defined using a generic SDP query language) from user 102 with SDP information from conversion algorithm 108. Using the SDP information from conversion algorithm 108, match algorithm 110 may determine whether the SDP information triggers one or more SDP rules. If so, match algorithm 110 or another related entity (e.g., policy decision algorithm 112) may trigger a policy related decision. In some embodiments, match algorithm 110 may indicate its determination (e.g., 'MATCH' or 'NO MATCH') to policy decision algorithm 112 for implementing or determining a policy related decision.

Policy decision algorithm 112 may represent software and/or logic for determining, deploying, or implementing policy related decisions. For example, policy decision algorithm 112 may receive a match determination from match algorithm 110. In this example, the match determination may indicate that SDP information for a particular session met criteria for trigger an SDP rule '1'. Continuing with this information, policy decision algorithm 112 may determine a set of policy related rules (e.g., a QOS and/or charging profile) associated with the SDP rule and may send or deploy these policy related rules to PCEF 116 or another entity.

In some embodiments, policy decision algorithm 112 may determine one or more policy related rules based on different and/or additional factors, e.g., factors other than information from an SDP rule. For example, policy decision algorithm 112 may ignore, modify, or override SDP rule based on network conditions, subscriber information, and/or other information obtained by PCRF 106. In this example, assuming that SDP rules would trigger PCRF 106 sending a QOS profile that is not feasible because of network congestion, PCRF 106 may modify the QOS profile that is to be deployed such that network congestion is not exacerbated.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

FIG. 2 is a diagram illustrating SDP information. SDP information may represent any information associated with a session, including SDP parameters, media attributes, or codec information. SDP information may be included in various SDP related messages, e.g., SOAP messages or Diameter messages. SDP information may also be located in various AVPs, header parameters, or payload portions.

Referring to FIG. 2, SDP information may include directional SDP information, such as uplink data 200 and downlink data 202. In some embodiments, each of uplink data 200 and downlink data 202 may represent data in a Codec-Data AVP in accordance with European Telecommunications Standards Institute (ETSI) technical specification (TS) 129 214; the disclosure of which is incorporated by reference herein in its entirety.

Uplink data 200 may include codec related information for a session. Uplink data 200 may represent SDP parameters sent from a user device to network 100. In some embodiment, uplink data 200 may also be referred to as local data by an SDP query language or an SDP rule. Uplink data 200 may include AVP header information including an AVP code, a vendor identifier, and an AVP length parameter. In line 1, uplink data 200 may include a direction indicator of 'uplink' indicating that the SDP information was received from the user device and is sent to the network. In line 2, uplink data 200 may include the word 'offer' indicating that uplink data 200 may represent an SDP offer in accordance with RFC 3264; the disclosure of which is incorporated by reference herein in its entirety. In some embodiments, line 2 may include a different word, such as 'answer', for indicating that uplink data 200 represents a different type of SDP message, such as an SDP answer.

In line 3, uplink data 200 may include an 's=' field indicating a textual session name, such as 'SDP Example'. In line 4, uplink data 200 may include an 'i=' field indicating textual information about the session, such as 'Information on SDP'. In line 5, uplink data 200 may include a 'u=' field indicating a uniform resource identifier (URI), e.g., 'http://www.example.com/sdprequest.pdf', for obtaining additional information about the session. In line 6, uplink data 200 may include an 'm=' field indicating a media description for the session of 'audio 4100 RTP/AVP 104 102 0 100'. The 'm=' field may contain multiple subfields, e.g., 'media', 'port', 'proto', and 'fmt'. The subfield 'media' may indicate a media type, such as 'audio', 'video', 'text', application. The subfield 'port' may indicate a transport port to which the media stream is sent. The subfield 'proto' may indicate a transport protocol. The subfield 'fmt' may indicate a media format description, such as 'RTP/AVP'. If the subfield 'fmt' is 'RTP/AVP', a list of RTP payload type numbers, e.g., '104 102 0 100', may be indicated.

In line 7-13, uplink data 200 may include various SDP attributes. In line 7, uplink data 200 may include an 'a=rtpmap:' attribute for mapping an RTP payload type number, e.g., '104', to a media encoding name, e.g., 'AMR WB/16000', that identifies the payload format, e.g., 'AMR-WB', and the clock speed, e.g., '16000'. In line 8, uplink data 200 may include an 'a=fmtp:' attribute for specifying format parameters (e.g., a 'mode-set' parameter) associated with the RTP payload type number '104'. In line 9, uplink data 200 may include an 'a=rtpmap:' attribute for mapping an RTP payload type number, e.g., '102', to a media encoding name, e.g., 'AMR/8000', that identifies the payload format, e.g., 'AMR', and the clock speed, e.g., '8000'. In line 10, uplink data 200 may include an 'a=fmtp:' attribute for specifying format parameters (e.g., a 'mode-set' parameter) associated with the RTP payload type number '102'. In line 11, uplink data 200 may include an 'a=rtpmap:' attribute for mapping an RTP payload type number, e.g., '100', to a media encoding name, e.g., 'telephone-event/8000', that the payload format, e.g., 'telephone-event', and the clock speed, e.g., '8000'. In line 12, uplink data 200 may include an 'a=fmtp:' attribute for specifying format parameters associated with the RTP payload type number '100'. In line 13, uplink data 200 may include an 'a=ptime:' attribute for indicating a length of time in milliseconds represented by the media in a packet.

Downlink data 202 may include codec related information for a session. Downlink data 202 may represent SDP parameters sent from network 100 to a user device. In some embodiment, downlink data 202 may also be referred to as remote data by an SDP query language or an SDP rule. Uplink link 200 may include AVP header information including an AVP code, a vendor identifier, and a length parameter. In line 1, downlink data 202 may include a direction indicator of 'downlink' indicating that the SDP information was received from the network and is sent to the user device. In line 2, downlink data 202 may include the word 'answer' indicating that downlink data 202 may represent an SDP answer in accordance with RFC 3264; the disclosure of which is incorporated by reference herein in its entirety. In some embodiments, line 2 may include a different word, such as 'offer', for indicating that downlink data 202 represents a different type of SDP message, such as an SDP offer.

In line 3, downlink data 202 may include an 's=' field indicating a textual session name, such as 'SDP Example Response'. In line 4, downlink data 202 may include an 'i=' field indicating textual information about the session, such as 'Information on SDP in Response'. In line 5, downlink data 202 may include a 'u=' field indicating a uniform resource identifier (URI), e.g., 'www.example.com/sdpresponse.pdf', for obtaining additional information about the session. In line 6, downlink data 202 may include an 'm=' field indicating a media description for the session of 'audio 4100 RTP/AVP 104 102'. The 'm=' field may contain multiple subfields, e.g., 'media', 'port', 'proto', and 'fmt'. The subfield 'media' may indicate a media type, such as 'audio', 'video', 'text', application. The subfield 'port' may indicate a transport port to which the media stream is sent. The subfield 'proto' may indicate a transport protocol. The subfield 'fmt' may indicate a media format description, such as 'RTP/AVP'. If the subfield 'fmt' is 'RTP/AVP', a list of RTP payload type numbers, e.g., '104 102', may be indicated.

In line 7-12, downlink data 202 may include various SDP attributes. In line 7, downlink data 202 may include an 'a=rtpmap:' attribute for mapping an RTP payload type number, e.g., '104', to a media encoding name, e.g., 'AMR WB/16000', that identifies the payload format, e.g., 'AMR-WB', and the clock speed, e.g., '16000'. In line 8, downlink data 202 may include an 'a=fmtp:' attribute for specifying format parameters (e.g., a 'mode-set' parameter) associated with the RTP payload type number '104'. In line 9, downlink data 202 may include an 'a=rtpmap:' attribute for mapping an RTP payload type number, e.g., '100', to a media encoding name, e.g., 'telephone-event/8000', that identifies the payload format, e.g., 'telephone-event', and the clock speed, e.g., '8000'. In line 10, downlink data 202 may include an 'a=fmtp:' attribute for specifying format parameters associated with the RTP payload type number '100'. In line 11, downlink data 202 may include an 'a=ptime:' attribute for indicating a length of time in milliseconds represented by the media in a packet. In line 12, downlink data 202 may include an 'a=maxptime:' attribute for indicating a maximum amount of media that can be encapsulated in each packet, expressed as time in milliseconds.

In some embodiments, an SDP query language may be usable by user 102, such as a network operator, for referencing SDP information received by PCRF 106. For example, an SDP query language may use SDP information references in an SDP rule for triggering PCRF 106 to evaluate SDP parameters when determining policy related rules. In some embodiments, an SDP query language may be capable of referring to SDP information based on source or direction. For example, an SDP query language may distinguish SDP information based on direction. In this example, the SDP query language may include a 'local' token for calls or references to uplink data 200, a 'remote' token for calls or references to downlink data 202, and a 'common' token for calls or references to data that is common to both uplink data 200 and downlink data 202.

In some embodiments, using an SDP query language, the variable 'common.sdp' may refer to common SDP parameters, the variable 'local.sdp' may refer to local SDP parameters, and the variable 'remote.sdp' may refer to remote SDP parameters. In some embodiments, using an SDP query language, the variable 'shared.sdp' may refer to common SDP parameters, the variable 'uplink.sdp' may refer to local SDP parameters, and the variable 'downlink.sdp' may refer to remote SDP parameters.

In some embodiments, an SDP query language may be capable of referring to any SDP line, e.g., an 's=' line, an 'i=' line, an 'u=' line, an 'a=ptime' line, an 'a=maxptime' line, and an 'm=' line. For example, an example SDP query language may reference an SDP line using the syntax, '.sdp.[X]', where X may be 's', 'i', 'u', 'm', 'a=ptime', or 'a=maxptime', among others. For example, assuming user 102 wants to refer to an 'i=' line of some uplink data using an SDP query language, the SDP parameter reference used may be 'local.sdp.[i]' and may resolve to 'Information on SDP' if uplink data 200 is inspected or evaluated by PCRF 106. In another example, assuming user 102 wants to refer to an 's=' line of some downlink data using an SDP query language, the SDP parameter reference used may be 'remote.sdp.[s]' and may resolve to 'SDP Example Response' if downlink data 202 is inspected or evaluated by PCRF 106. In another example, assuming user 102 wants to refer to an 'a=ptime' line that is common to downlink data and uplink data for a particular session using an SDP query language, the SDP parameter reference used may be 'common.sdp.[a=ptime]' and may resolve to '20' if uplink data 200 and downlink data 202 for a session is inspected or evaluated by PCRF 106.

In some embodiments, an SDP query language may be capable of referring to portions or SDP subfields of an 'm=' line. For example, an example SDP query language may refer to an 'm=' line using SDP subfield identifiers. In this example, any parameter within the 'm=' line may be referenced using the syntax, '.sdp.[m].X, where X may be 'fmt', 'port', 'media', or 'proto'. For example, assuming user 102 wants to refer to a media type in an 'm=' line of some uplink data using an SDP query language, the SDP parameter reference used may be local.sdp.[m].media' and may resolve to 'audio' if uplink data 200 is inspected or evaluated by PCRF 106. In another example, assuming user 102 wants to refer to an 's=' line of some downlink data using an SDP query language, the SDP parameter reference used may be 'remote.sdp.[s]' and may resolve to 'SDP Example Response' if downlink data 202 is inspected or evaluated by PCRF 106. In another example, assuming user 102 wants to refer to an 'a=ptime' line that is common to downlink data and uplink data in an SDP rule using an SDP query language, the SDP parameter reference used may be 'common.sdp.[a=ptime]' and may resolve to '20' if uplink data 200 and downlink data 202 for a session is inspected or evaluated by PCRF 106.

In some embodiments, an SDP query language may be capable of referring to codec specific attributes, e.g., an 'a=rtpmap:' attribute or an 'a=fmtp:' attribute. For example, an example SDP query language may reference codec specific attributes using the syntax, sdp.[codec-name(codec name).attributename.option]. In this example, 'codec name' is the name of the codec as defined in the rtpmap parameter, 'attributename' is the name of the referenced attribute in the 'a=' line, and 'option' is the attribute specific option, which may be based on the attribute and/or codec being defined. For example, assuming user 102 wants to refer to a clock rate parameter associated with the 'AMR-WB' codec for some uplink data using an SDP query language, the SDP parameter reference used may be 'local sdp.[codec-name (AMR-WB).rtpmap.clockrate]' and may resolve to '16000' if uplink data 200 is inspected or evaluated by PCRF 106. In another example, assuming user 102 wants to refer to a mode set parameter associated with the 'AMR-WB' codec for some uplink data using an SDP query language, the SDP parameter reference used may be 'remote sdp.[codec-name (AMR-WB).fmtp.mode-set]' and may resolve to '2,6' if downlink data 202 is inspected or evaluated by PCRF 106.

It will also be appreciated that uplink data 200 and downlink data 202 is for illustrative purposes and that additional and/or different SDP information (e.g., other SDP parameters and/or attributes defined in RFC 4566) than that depicted in FIG. 2 may be referenced using an SDP query language.

FIG. 3 is a diagram illustrating SDP rule information 300 according to an embodiment of the subject matter described herein. SDP rule information 300 may represent any information associated with SDP rules, such as SDP rule identifiers and/or SDP rules. In some embodiments, SDP rule information 300 may be accessed and/or stored by PCRF 106, conversion algorithm 108, match algorithm 110, and/or policy decision algorithm 112. In some embodiments, SDP rule information 300 may be stored in data storage 114 using various data structures.

Referring to FIG. 3, SDP rule information 300 may include associations between SDP rule identifiers and related SDP rules and may be depicted using a table. For example, a table representing SDP rule information 300 may comprise columns and/or fields for SDP rule identifiers and SDP rules.

AN SDP rule identifier (ID) field may comprise a value, a name, and/or a related identifier for indicating a particular SDP rule. For example, an SDP rule ID may include a unique number or name, such as '1', '2', and '3'.

AN SDP rule field may comprise one or more expressions, code, logic, or text representing an SDP rule. Each SDP rule may indicate one or more policy related rules that should be implemented if a session includes certain SDP information. Each SDP rule may reference SDP information (e.g., SDP parameters) using a generic SDP query language, where PCRF 106 may be configured to resolve the references into discrete or discernible values based on the SDP information being evaluated or processed by PCRF 106.

In some embodiments, each SDP rule may be directed to one or more SDP parameters or related information and/or may indicate one or more different policy related rules. For example, an SDP rule may indicate that 'if local.sdp.[i]='request x' and remote.sdp[i]='response x' then implement 'policy profile 1'. In another example, an SDP rule may indicate that 'if (common.sdp.[m].fmt includes '100' or common.sdp.[m].fmt includes '104') and common.sdp.[m].media='audio' and common.sdp.[m].proto='RTP/AVP' then implement 'policy profile 2'. In another example, an SDP rule may indicate that 'if local.sdp.[a=maxptime]>'60' then implement 'PCC rule 1'.

It will also be appreciated that SDP rule information 300 is for illustrative purposes and that additional and/or different data than SDP rule information 300 may be usable for representing and/or utilizing SDP rules. Further, SDP rule information 300 may be stored or managed using various data structures and/or computer readable media. Further, some SDP rule information 300 may be stored in separate and/or different locations.

Figure 4:
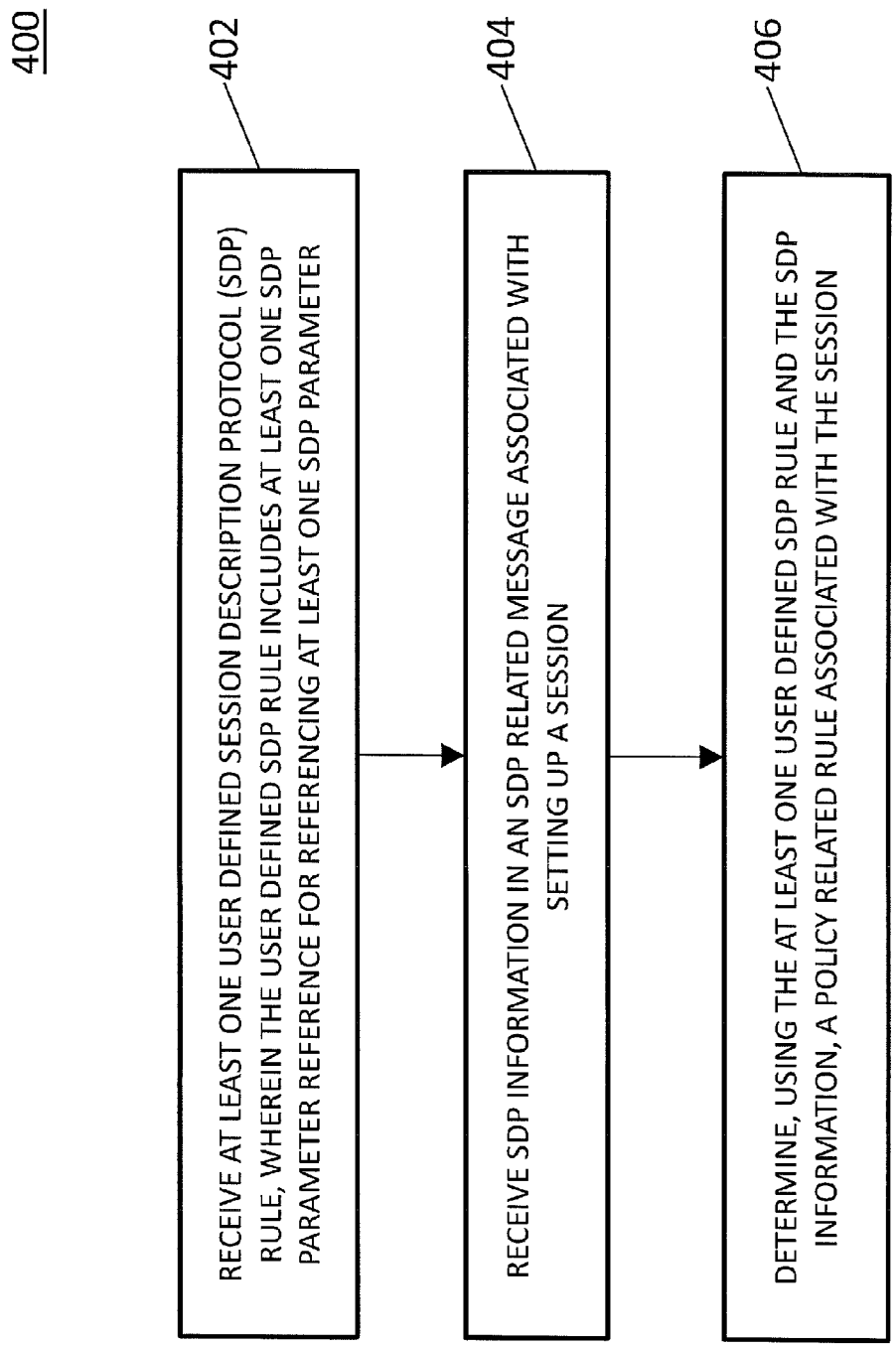
FIG. 4 is a diagram illustrating a process for using user defined SDP rules according to an embodiment of the subject matter described herein.

FIG. 4 is a diagram illustrating a process 400 for using SDP rules according to an embodiment of the subject matter described herein. In some embodiments, process 400, or portions thereof (e.g., steps 402, 404, and/or 406), may be performed by or at PCRF 106, conversion algorithm 108, match algorithm 110, policy decision algorithm 112, and/or another node or module.

Referring to process 400, in step 402, at least one user defined SDP rule is received. The user defined SDP rule may include at least one SDP parameter reference (e.g., a programming language variable) for referencing at least one SDP parameter. For example, user 102 may send an SDP rule to PCRF 106, where the SDP rule include SDP related references or variables (e.g., 'common.sdp[m].media', 'common.sdp[m].port', 'common.sdp.[m].proto', and/or 'common.sdp[m].fmt'). In this example, PCRF 106 may resolve these references into discernible values (e.g., 'common.sdp.[m].media'='audio', 'common.sdp.[m].port'= '4100', 'common.sdp.[m].proto'='RTP/AVP', common.sdp.[m].fmt='104 102') for a given session.

In step 404, SDP information in an SDP related message associated with setting up a session may be received. For example, an Rx AAR message including SDP information may be sent to PCRF 106. In this example, the SDP information may be similar to uplink data 200 and downlink data 202.

In step 406, a policy related rule associated with the session may be determined using the at least one user defined SDP rule and the SDP information. For example, PCRF 106, or one or more algorithms therein, may determine whether a user defined SDP rule has been met for a given session by first resolving SDP related references into discrete values and then determining whether these discrete values meet execution criteria of the user defined SDP rule.

In some embodiments, a policy related rule may be sent to PCEF 116, a traffic detection function (TDF), a traffic steering support function (TSSF), or a network node for enforcing the policy related rule.

In some embodiments, SDP information may be sent to PCRF 106 by an AF, an IMS network node, an EPC network node, a SIP server, a server, a client, or a network node.

In some embodiments, prior to determining a policy related rule, at least one SDP rule and/or SDP information may be parsed and stored in one or more data structures. For example, PCRF 106 may be store SDP information in one or more hash maps or associative arrays. In this example, the SDP information may be indexed and/or searchable.

In some embodiments, SDP information may be received by PCRF 106 via an SDP related message. For example, an SDP related message may include a call setup message, a Diameter message, a Diameter Rx message, a SOAP message, an HTTP message, an HTTP Rx message, or an Rx message.

In some embodiments, determining a policy related rule may comprise resolving, using a SDP information, at least one SDP parameter reference into at least one discernible value, determining, using a match algorithm implemented by the PCRF, whether the at least one discernible value meets execution criteria of a user defined SDP rule for triggering a policy related rule, and in response to determining that the at least one discernible value meets execution criteria of the user defined SDP rule, selecting the policy related rule.

In some embodiments, at least one user defined SDP rule may be received before initialization, during initialization, or after initialization of PCRF 106. For example, user 102 may send SDP rules at various times to PCRF 106. In this example, PCRF 106 may be configured to receive, process, and/or implement the SDP rules on-the-fly, e.g., without restarting or reconfiguring PCRF 106.

It will be appreciated that process 400 is for illustrative purposes and that different and/or additional actions may be used. It will also be appreciated that various actions described herein may occur in a different order or sequence.

It should be noted that PCRF 106 and/or functionality described herein may constitute a special purpose computing device. Further, PCRF 106 and/or functionality described herein can improve the technological field of PCRF configuration by using user defined SDP rules to dynamically configure a PCRF. Further, since user defined SDP rules utilize a generic language for indicating various SDP parameters, a user (e.g., a network operator) can quickly and efficiently add or change policy related rules based on SDP information or parameters, e.g., without having to access and modify PCRF source code as required by conventional PCRF systems.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for using user defined session description protocol (SDP) rules, the method comprising:
at a policy and charging rules function (PCRF):
receiving, from a user device or a network operated device, at least one user defined session description protocol (SDP) rule, wherein the user defined SDP rule includes at least one SDP parameter reference for referencing at least one SDP parameter;
receiving, from at least one network node, SDP information in an SDP related message associated with setting up a session; and
determining, using the at least one user defined SDP rule and the SDP information, a policy related rule associated with the session, wherein determining the policy related rule comprises:
resolving, using the SDP information, the at least one SDP parameter reference into at least one discernible value;
determining, using a match algorithm implemented by the PCRF, whether the at least one discernible value meets criteria of the user defined SDP rule for triggering the policy related rule; and
in response to determining that the at least one discernible value meets criteria of the user defined SDP rule, selecting the policy related rule.

2. The method of claim 1 comprising:
sending the policy related rule to a policy and charging enforcement function (PCEF), a traffic detection function (TDF), a traffic steering support function (TSSF), or a network node for enforcing the policy related rule.

3. The method of claim 1 wherein the SDP information is sent by an application function (AF), an Internet protocol (IP) multimedia subsystem (IMS) network node, an evolved packet core (EPC) network node, a session initiation protocol (SIP) server, a server, a client, or a network node.

4. The method of claim 1 wherein, prior to determining the policy related rule, the at least one SDP rule or the SDP information is parsed and stored in one or more data structures.

5. The method of claim 1 wherein the SDP information is received via an SDP related message.

6. The method of claim 1 wherein the SDP related message includes a call setup message, a Diameter message, a Diameter Rx message, a simple object access protocol (SOAP) message, an HTTP message, an HTTP Rx message, or an Rx message.

7. The method of claim 1 wherein the at least one user defined SDP rule is received before initialization, during initialization, or after initialization of the PCRF.

8. A system for using user defined session description protocol (SDP) rules, the system comprising:
a policy and charging rules function (PCRF) including:
a processor; and
a memory, wherein the PCRF is configured to receive, from a user device or network operated device at least one user defined session description protocol (SDP) rule, wherein the user defined SDP rule includes at least one SDP parameter reference for referencing at least one SDP parameter, to receive, from at least one network node, SDP information in an SDP related message associated with setting up a session, and to determine, using the at least one user defined SDP rule and the SDP information, a policy related rule associated with the session, wherein the PCRF is configured to resolve, using the SDP information, the at least one SDP parameter reference into at least one discernible value, to determine, using a match algorithm implemented by the PCRF, whether the at least one discernible value meets criteria of the user defined SDP rule for triggering the policy related rule, and in response to determining that the at least one discernible value meets criteria of the user defined SDP rule, to select the policy related rule.

9. The system of claim 8 where the PCRF is configured to send the policy related rule to a policy and charging enforcement function (PCEF), a traffic detection function (TDF), a traffic steering support function (TSSF), or a network node for enforcing the policy related rule.

10. The system of claim 8 wherein the SDP information is sent by an application function (AF), an Internet protocol (IP) multimedia subsystem (IMS) network node, an evolved packet core (EPC) network node, a session initiation protocol (SIP) server, a server, a client, or a network node.

11. The system of claim 8 wherein the PCRF is configured to parse and store the at least one SDP rule or the SDP information in one or more data structures prior to determining the policy related rule.

12. The system of claim 8 wherein the SDP information is received via an SDP related message.

13. The system of claim 8 wherein the SDP related message includes a call setup message, a Diameter message, a Diameter Rx message, a simple object access protocol (SOAP) message, an HTTP message, an HTTP Rx message, or an Rx message.

14. The system of claim 8 wherein the PCRF is configured to receive the at least one user defined SDP rule before initialization, during initialization, or after initialization of the PCRF.

15. A non-transitory computer readable medium comprising computer executable instructions that when executed by a processor of a policy and charging rules function (PCRF) cause the PCRF to perform steps comprising:
receiving, from a user device or network operated device, at least one user defined session description protocol (SDP) rule, wherein the user defined SDP rule includes at least one SDP parameter reference for referencing at least one SDP parameter;
receiving, from at least one network node, SDP information in an SDP related message associated with setting up a session; and
determining, using the at least one user defined SDP rule and the SDP information, a policy related rule associated with the session, wherein determining the policy related rule comprises:
resolving, using the SDP information, the at least one SDP parameter reference into at least one discernible value;
determining, using a match algorithm implemented by the PCRF, whether the at least one discernible value meets criteria of the user defined SDP rule for triggering the policy related rule; and
in response to determining that the at least one discernible value meets criteria of the user defined SDP rule, selecting the policy related rule.

16. The non-transitory computer readable medium of claim 15 comprising:
   sending the policy related rule to a policy and charging enforcement function (PCEF) for enforcing the policy related rule.

17. The non-transitory computer readable medium of claim 15 wherein the SDP information is sent by an application function (AF), an Internet protocol (IP) multimedia subsystem (IMS) network node, a session initiation protocol (SIP) server, a server, a client, or a network node.

18. The non-transitory computer readable medium of claim 15 wherein, prior to determining the policy related rule, the at least one SDP rule or the SDP information is parsed and stored in one or more data structures.

* * * * *